United States Patent Office 3,510,095
Patented May 5, 1970

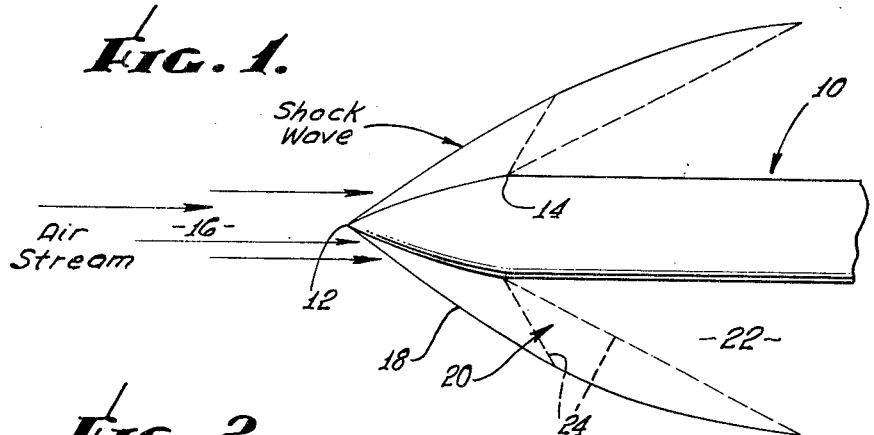
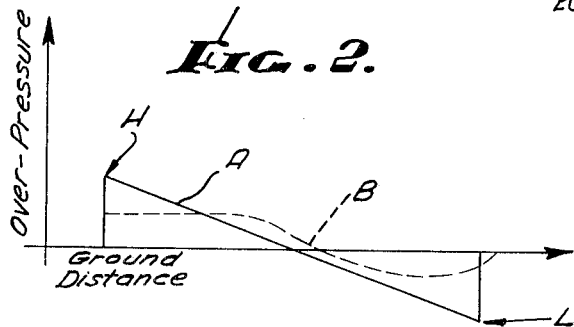
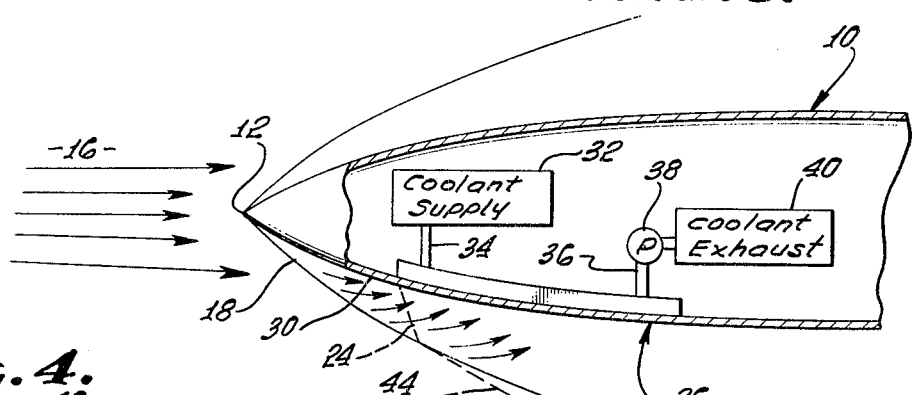
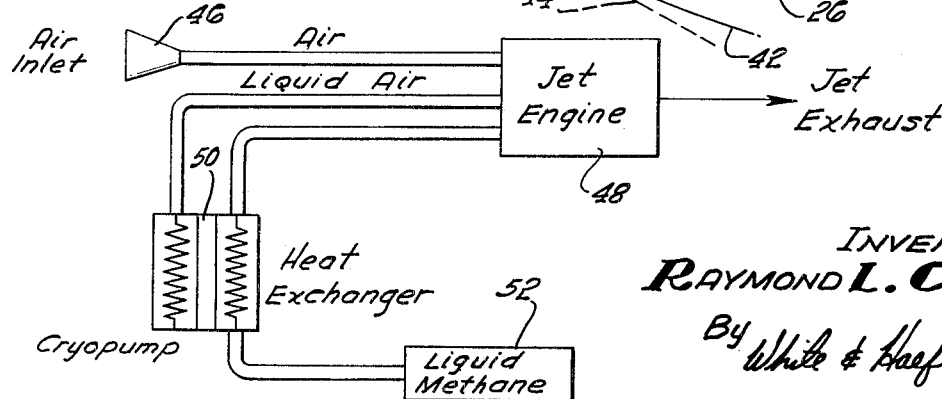
INVENTOR.
RAYMOND L. CHUAN
BY White & Haefliger
ATTORNEYS.

3,510,095
SONIC BOOM AMELIORATION
Raymond L. Chuan, Altadena, Calif., assignor, by mesne assignments, to The Susquehanna Corporation, a corporation of Delaware
Filed Aug. 8, 1968, Ser. No. 751,084
Int. Cl. B64c 23/00
U.S. Cl. 244—130                 9 Claims

ABSTRACT OF THE DISCLOSURE

Shock waves which are generated at the leading edges of aircraft and are audible on the ground as sonic booms are lessened in their booms, by reducing the peak pressure associated with the wave.

This is accomplished by cryopumping the atmosphere adjacent the aircraft surfaces to a highly condensed form.

BACKGROUND OF THE INVENTION

Field of the invention

This invention has to do with amelioration of sonic booms. Particularly, the invention has reference to method and apparatus by which the shock waves productive of sonic booms are uncompressed to lower peak values of pressure associated with the wave, to lessen intensity of any booms on the ground.

Sonic booms are a matter of national concern. Future aircraft development, particularly in the commercial field may well depend on successful solution of the problem of jarring and even destructive booms now inevitable in supersonic flight. Already, the plans for a commercial supersonic transport are in jeopardy pending an assessment of the public reaction to continual sonic booms in large metropolitan areas.

Prior art

The causes of sonic booms are fairly well understood. What has been lacking is a solution to the problem which does not require impractical aircraft configurations. In general, booms are the result of an abrupt, albeit only incremental pressure rise or pulse passing along the ground. These pulses typically are waves of pressurized atmosphere in which the overpressures are only from one to four pounds/square foot higher than ambient ground pressures (~2100 pounds/square foot).

So slight a pressure change, roughly equivalent to moving two floors in an elevator, would not be audible or otherwise sensible, except for the suddeness or abruptness of the change.

In flight, an aircraft continuously pushes its way through the atmosphere setting up pressure waves which radiate outwardly as determined by the configuration of the aircraft. These waves move away from the plane and through the atmosphere at rates dictated by the nature of the medium, but at a finite speed. When the aircraft moves more rapidly than the pressure waves formed by the movement can themselves move through the atmosphere there occurs an accumulation or buildup of waves at the leading edges (nose, wings, tail, etc.) of the aircraft. These leading edge waves obviously are moving as fast as the aircraft since they remain ahead of it, but they cannot move outward (forward) of the plane at a sufficient rate. This is because their propagation rate through the atmosphere is fixed at a value lower than the aircraft speed.

The resultant accumulation of pressure waves is termed a shock wave. It is a sharp pressure pulse. Outwardly of the aircraft, the shock wave is not driven forward at the same speed. There results a generally conical shock wave having its apex at the aircraft nose. This cone concept is inexact since many shock waves actually emanate from the aircraft but for present purposes it is sufficient. The lower edge of this cone passing along the ground may be visualized as an abrupt pressure rise rippling over the earth's surface. The result is an audible crack or "boom" and a sensible vibration. Often two successive booms are heard or felt, the earlier being termed the nose shock and the later (by about 0.05 second) being termed the tail shock.

The intensity of the boom or peak value of the pulse overpressure is dependent on atmospheric conditions, flight path of the aircraft and aircraft design. Since the atmospheric conditions cannot be controlled and the flight path (angle of climb, turn characteristics and altitude) are not highly variable, effort has concentrated on aircraft design to ameliorate the sonic boom problem.

Assuming the shock wave to be as pictured above, namely a multiplicity of pressure waves steadily pushed ahead and to the side of the aircraft leading edges, it would be ideal to place rearwardly of these edges a negative curvature so that the highly compressed atmosphere forming the shock wave, could expand, and thus decompress. In practice, this would entail a sharp reduction in fuselage diameter just behind the aircraft nose, which is obviously impractical. Thus the problem, until the present invention, has been unsolved.

SUMMARY OF THE INVENTION

It is a major objective of the present invention to ameliorate sonic booms by lessening the shock waves which cause them. In general, this objective is achieved by decompressing the shock wave and reducing its peak pressure as though there was a negative curvature to the aircraft behind the leading edges thereof but without significant modification of the normal aircraft contour.

It has been discovered that rapidly condensing the atmosphere locally adjacent the aircraft body, which term includes wings, tail and fuselage, rearwardly of the leading edges at which shock waves are formed, reduces the pressure peak of the shock wave, apparently by induced expansion, whereby ground level effects of the wave are minimized or eliminated and that such condensations may be effected by cryopumping the atmosphere adjacent selected areas of the aircraft body.

Thus in an aircraft capable of speeds tending to compress the atmosphere into a shock wave of abruptly superambient pressure which radiates outwardly and rearwardly of the leading edges of the aircraft there is provided in accordance with the invention, means for ameliorating the auditory effects of this wave on the ground which includes means for reducing the atmospheric pressure locally adjacent the aircraft surface to reduce the peak pressure associated with the shock wave. The pressure reducing means typically is a cryopump and includes coolant within the aircraft and in heat transfer proximity to the aircraft surface which is thus adapted to condense locally adjacent atmospheric gases to correspondingly locally reduce atmospheric pressures. The coolant may also be combustible and may be used as fuel by including also means for withdrawing the coolant from heat transfer proximity to the aircraft surface following condensation of atmospheric gases thereby and passing the now superheated coolant to the aircraft engine. Intermittant or selective operation of the pressure reduction means may be effective by providing selectively operable means for delivering coolant to locations interiorly adjacent the aircraft surfaces. Means are provided for carrying the coolant at these locations which means are generally positioned rearwardly adjacent desired leading edges of the aircraft and particularly on the underside of the aircraft.

A method is also provided for operating an aircraft which flies through the atmosphere at a speed tending to compress the atmosphere into an abrupt shock wave of superambient pressure which radiates outwardly and rearwardly from the leading edges of the aircraft and which is audibly detectable on the ground as a sonic boom. The method includes reducing the atmospheric pressure adjacent the aircraft body to reduce the peak pressure associated with the wave e.g. by expansion toward the aircraft of the shock wave, thereby to ameliorate sonic booms incident to the flight of the aircraft. Reduction of atmospheric pressure is effected by condensing atmospheric gases e.g. against the aircraft surface and to the liquid phase.

It is an effect of the just described pressure reduction that the angle between the shock wave and the aircraft line of flight is reduced so that the wave increasingly moves substantially tangentially to the earth's surface.

The atmospheric gases may be selectively condensed e.g. liquefied against the aircraft surface in heat transfer zones formed on the surface desirably adjacent and rearward of the aircraft leading edges to reduce atmospheric pressure adjacent the surface by heat transfer contact there with a subcooled coolant e.g. liquid methane. The coolant now superheated as a result of the heat transfer may, if combustible, be utilized as fuel for the aircraft.

BRIEF DESCRIPTION OF THE DRAWING

FIG. 1 is a diagrammatic view of shock wave generation around an aircraft body;

FIG. 2 is a graphical depiction of a shock wave pressure curve relative to ground distance;

FIG. 3 is a diagrammatic view of a typical leading edge of a supersonic aircraft body provided with sonic boom reducing means according to the invention; and FIG. 4 is a diagrammatic view of a combined coolant-fuel system according to the invention.

DESCRIPTION OF THE PREFERRED EMBODIMENTS

Fundamental in the operation of the present invention is the inverse relationship between gas pressure and gas temperature and the consequent condensability of gases by large reductions in temperature. It has been shown, for example, that a space may be substantially evacuated by cooling the walls to a temperature at which the gas in the space will condense on the walls, to a liquid or solid having a vapor pressure sufficiently low to remain on the wall. Thus the space is substantially evacuated. This technique of pumping by condensation against a cold surface is termed "cryopumping."

It has been discovered that cryopumping techniques can be used to ameliorate sonic booms.

It will be recalled that the shock waves productive of booms would be much reduced in intensity, if the wave were permitted to decompress e.g. by expansion into a negatively curved portion of the wing or fuselage of the aircraft. Cryopumping offers a means of simulating an expansion without having a negative curvature in the aircraft body that is, by rapidly chilling, and condensing against the aircraft surface, the airstream moving across the aircraft, the atmospheric pressure adjacent the condensing zone is dropped, as though a negative curvature zone were being passed. This pressure drop sets up an expansion wave between the aircraft and the shock wave which counteracts and cancels the shock wave, reducing its peak pressure value and lessening the intensity of sonic booms, if any, attributable to the shock wave. There is thus accomplished thermodynamically what a reverse curvature would accomplish mechanically, namely a reduced pressure zone adjacent the aircraft into which the shock wave may expand and with such expansion, decompress to less audible, less destructive pressure values.

With reference to FIG. 1 of the drawing an aircraft body 10 of conventional aerodynamic configuration having a nose 12 and a shoulder 14 is shown. On approaching the body 10 in flight the airstream, indicated by arrows 16, is turned discontinuously. This generates a shock wave 18. As the airstream flows around shoulder 14 of the body 10, the change of curvature of the body creates an expansion zone 20 into which the airstream moves resulting in a lowering of pressure at area 22 outward of the aircraft body. An expansion wave indicated at 24, is set up. In actual flight, the intersection of the shock wave 18 and the expansion wave 24 takes place at a very great distance from the aircraft body 10. In FIG. 1 this distance has been distorted for illustrative purposes. For example, even when the aircraft is flying at 40,000 feet the expansion wave 24 does not intersect the shock wave 18 before the shock wave reaches the ground, causing a sonic boom.

It has been established experimentally that the intensity of a shock wave is attenuated with distance. Specifically the peak overpressure associated with a shock wave varies inversely as the ¾ power of the ratio of the aircraft altitude to the aircraft length. For a very short aircraft (much shorter than the proposed SST) the decay of the overpressure with distance would be greater than for a long aircraft. Similarly where the expansion zone 22 in FIG. 1 begins very close to the nose 12 overpressure decay is also increased.

Ideally the expansion zone 22 is located adjacently rearward of the nose or other leading edge as determined by the position of the shoulder 14, the so-called "expansion corner." Geometric limitations on useable shapes of aircraft preclude formation of an expansion corner in the ideal location.

In the present invention, conventional aircraft body shapes are retained, but the air stream along the body is turned inwardly as if there was no physical boundary (the body surface) there. The result is an expansion in effect identical to that produced by a body having an expansion corner. This effective expansion is achieved by cryopumping the atmosphere constituting the air streams along the surface of the aircraft body, e.g. by refrigerating the aircraft body surface to a sufficiently low temperature that the atmosphere flowing past is condensed. The cryopump acts as a sink for the air stream so that to the air stream the body boundary appears absent.

With reference to FIG. 2 the ground effect of a shock wave generated in the absence of cryopumping or other expansion following generation is shown. It can be seen that the overpressure curve, line A, is of an N shape. The undesirable effects of the sonic boom depend on the peak magnitude of the overpressure and the rate of build-up, as explained. With reference to curve A, it can be seen that passage of a supersonic aircraft is accompanied by two shock-wave systems, the nose shock and the tail shock. The former shock raises the pressure above ambient to point H on curve A. This is followed by an expansion to subambient pressure, point L on the curve A, followed by a return to ambient through the rear shock wave. In the present invention the N curve is greatly modified by lowering point H and raising point L, the maximum and minimum points on curve A to produce a curve like curve B, illustratively.

Modification of the ground level pressure peaks normally associated with supersonic flight is achieved in the present invention by reducing the atmospheric pressure adjacent the aircraft body. This turns the air flow along the body inward and allows expansion of the shock wave, and resultant accelerated decompression thereof.

The extent to which the air flow along the body is inwardly turned depends on the reduction in air vapor pressure along the body which is dependent on the lowness of the temperature of the cryopumping areas of the body.

The technology of cryopumping is well-known and need not be detailed here except to point out that provision of a supercooled surface on the aircraft body enables local condensation of atmospheric gases to correspondingly locally reduce atmospheric pressure. In practice, and with reference to FIG. 3, the aircraft body 10 is provided with strategically arranged cryopumping surfaces 26. In general these surfaces 26 are located on the underside of the aircraft to reduce overpressures which may reach the ground to produce sonic booms. The cryopumping surfaces 26 are located rearwardly adjacent the leading edges of the aircraft body 10 e.g. of nose 12 as shown in FIG. 3. Other cryopumping surfaces may be positioned behind the leading edges of the wings (not shown) of the aircraft.

To provide cryopumping at the aircraft surface requires only that supercold fluid or coolant be in heat transfer proximity to the surface to be used for cryopumping. The coolant is desirably a condensed gas which can be controllably delivered and withdrawn from the cryopumping surfaces of the aircraft. Preferred gases will be those providing coolant temperatures of less than 100° Kelvin. The condensation of atmospheric gases obviously releases great quantities of heat. These are received by the coolant through the aircraft body skin 30. Thus in FIG. 3, coolant such as sub-cooled liquid methane (40° K.) is drawn from supply 32 along pipe 34 leading to the interior of cryopumping surface 26. At surface 26 which may be the exterior skin of the aircraft body 10, as shown, the coolant is in heat transfer proximity to the atmospheric gases constituting the air streams 16. These air streams are turned inwardly as shown toward the cryopumping surface 26 as a reduced pressure is generated there by the condensation of gases against the surface 26. Coolant at the interior of cryopumping surface 26 absorbs the heat of condensation of the gases and is desirably drawn from the surface along line 36 as by pump 38 to storage or waste or other use indicated hereinafter through coolant exhaust 40. The result of the continuing condensation of atmospheric gases along the underside of body 10 is believed to be a shock wave pattern like that shown in FIG. 3. Note the shock wave 18 is intersected by the front edge of expansion wave 24 and is thus drawn inward, toward the aircraft body 10 (line 42) to reduce the angle between the body and the wave from its course otherwise shown as dotted line 44. This results in far greater distance travel by the shock wave 18 before reaching the ground and resultant increased attenuation thereof with the distance traveled so as to lessen overpressure peaks and thus boom intensity. In effect, the normal decay process has been accelerated by generation of an expansion wave closely adjacent to shock wave generation area.

The cryopumping accomplished by surfaces 26 is dependent on their temperature which in turn is dependent on the temperature, rate of supply and withdrawal of coolant to these surfaces. It is likely that sonic booms will have to be curtailed only over large metropolitan areas and perhaps only during take-offs when the factors of heavy lading, high angle of attack and propinquity to the ground all combine to make the booms quite severe. For this purpose the cryopump means may be made selectively operable, so that coolant is passed in heat transfer proximity to the atmospheric gases adjacent the aircraft body surface only during selected portions of the flight such as the take-off.

In a preferred embodiment of the invention, advantage is taken of the characteristics of the fuel proposed for the supersonic transport i.e. methane or other combustible gas and the heat input inherent in a cryopumping operation to transfer the heat of condensation of the atmospheric gases to the sub-cooled methane, thus superheating the methane, and passing the superheated coolant-fuel to the engines of the aircraft. In addition the air condensed against the aircraft surface may be fed to the engines as a sole or supplementary oxidizer for combustion of the fuel.

Such an arrangement is depicted in FIG. 4. Conventional air intake 46 feeds air to engine 48. The cryopump, shown as a heat exchanger 50 condenses air against the aircraft body surfaces and this air is fed as as a liquid to the engine 48. Fuel in the form of sub-cooled, combustible liquid such as liquefied methane passes from supply 52 through the heat exchanger 50, there absorbing heat to condense the adjacent air streams and accomplish the cryopumping. The methane, now heated and vaporized is passed directly to the engine 48 for mixture with air and combustion to provide propulsive power. Similarly the condensed air is passed from the heat exchanger 50 to the engine 48 for use in oxidizing the methane fuel, in supplement to the air from inlet 46.

I claim:

1. The method of operating an aircraft including: flying the aircraft through the atmosphere at a speed tending to compress the atmosphere into a shock wave of abruptly greater pressure radiating outwardly and rearwardly from the leading edges of the aircraft, which wave is audible on the ground as a sonic boom, and condensing atmospheric gases at the surface of the aircraft to reduce the atmospheric pressure adjacent the aircraft body and to reduce the peak pressure associated with said wave, thereby to ameliorate sonic booms incident to flight of said craft.

2. The method according to claim 1 including also condensing said gases to the liquid phase against the aircraft surface.

3. The method according to claim 1 including also decreasing the angle between the aircraft and said weave.

4. The method according to claim 1 including also maintaining subcold coolant interiorly of the aircraft surface to rapidly cool the atmospheric gases adjacent the surface to condense the same.

5. The method according to claim 4 in which said coolant is combustible and including also liquefying atmospheric gases at the aircraft surface by heat transfer and utilizing the coolant as fuel for said aircraft.

6. The method according to claim 5 in which said coolant is liquid methane.

7. The method according to claim 4 in which said coolant forms heat transfer zones on the aircraft surface adjacent and rearward of the aircraft leading edges.

8. The method according to claim 1 in which said condensing is effected selectively during flight.

9. The method according to claim 8 in which condensed gases are accumulated over populous areas and are revaporized during flight over nonpopulous areas.

References Cited

UNITED STATES PATENTS

| 2,874,922 | 2/1959 | Whitcomb | 244—130 |
| 2,943,828 | 7/1960 | Van Driest | 244—117 |
| 3,446,464 | 5/1969 | Donald | 244—130 |

MILTON BUCHLER, Primary Examiner

J. E. PITTENGER, Assistant Examiner